United States Patent [19]

McClelland et al.

[11] 4,383,011

[45] May 10, 1983

[54] MULTICELL RECOMBINING LEAD-ACID BATTERY

[75] Inventors: Donald H. McClelland, Littleton; Toshio Uba, Denver; Larry K. W. Ching, Littleton, all of Colo.

[73] Assignee: The Gates Rubber Company, Denver, Colo.

[21] Appl. No.: 221,226

[22] Filed: Dec. 29, 1980

[51] Int. Cl.³ .......................................... H01M 10/12
[52] U.S. Cl. ...................................... 429/54; 429/94; 429/149; 429/160; 429/225; 429/158
[58] Field of Search ................. 429/53, 54, 94, 151, 429/58, 159, 160, 163, 164, 176, 177, 57, 99, 149, 225

[56] References Cited

U.S. PATENT DOCUMENTS

| 2,742,520 | 4/1956 | Pucher et al. | 429/160 |
| 2,836,642 | 5/1958 | Bauer | 429/118 |
| 3,170,819 | 2/1965 | Abramson | 429/60 |
| 3,704,173 | 11/1972 | McClelland et al. | 429/181 X |
| 3,846,175 | 11/1974 | Desai | 429/60 X |
| 3,862,861 | 1/1975 | McClelland et al. | 429/57 |
| 4,121,017 | 10/1978 | Dougherty | 429/177 X |

Primary Examiner—Anthony Skapars
Attorney, Agent, or Firm—C. H. Castleman, Jr.; H. W. Oberg, Jr.; Raymond Fink

[57] ABSTRACT

A recombining lead-acid battery with absorbed electrolyte is disclosed having multiple cells positioned in a sealed monobloc container, and cell partitioning members constructed to define a gas space common to all the cells of the battery. When the battery is overcharged imbalance in electrolyte fill among the cells is reduced as the amount of water in each cell tends to equalize through redistribution via gas recombination preferentially in the drier cells.

37 Claims, 9 Drawing Figures

MULTICELL RECOMBINING LEAD-ACID BATTERY

BACKGROUND OF THE INVENTION

This invention relates to rechargeable sealed lead-acid batteries of the absorbed electrolyte type, in which oxygen generated on overcharge is consumed internally within the battery.

The first sealed recombining lead-acid battery of high discharge capacity whose useful life was not limited by water loss on overcharge was revealed in the disclosure of McClelland et al. U.S. Pat. No. 3,862,861. Applicants' assignee pioneered the development and commercialization of the invention of U.S. Pat. No. 3,862,861 by introducing a line of spirally wound cells characterized by a highly absorptive separator and unique electrolyte distribution. Subsequently, monobloc multicell parallel plate batteries employing these principles were introduced, the cells of which were sealed off from one another to preclude intercell migration of electrolyte and/or gases. Because the electrolyte fill level and intracell compression between plates and separators of these batteries can vary significantly from cell to cell, the respective voltages and capacities of the cells also vary, as do the gas recombination rates as well. These variations in cell characteristics compromise battery performance and life.

With respect to sealed alkaline and certain sealed acid systems in which the amount of electrolyte is limited to that necessary for ion transfer between the electrodes as taught in Abramson U.S. Pat. No. 3,170,819 (however, quite unlike the lead-acid system and more particularly the unique electrolyte distribution taught in the aforementioned U.S. Pat. No. 3,862,861) there is suggested the use of a manifolding arrangement between the cells in a multicell battery to overcome problems due to unequal capacities of individual cells. It is taught that oxygen liberated from weaker cells which are driven in reverse during a complete discharge combines with the negative active material of stronger cells which are not yet polarized, thereby tending to equalize the state of charge of the cells of the battery and improve its performance. This patent applies to electrochemical systems employing an invariant electrolyte, the capacity of which is not determined by the amount of electrolyte present. In the alkaline system, for instance, hydroxyl ions are generated during a charge or discharge at approximately the same rate at one electrode as they are consumed at the opposite electrode. In contrast, the sulfate ion quantity and concentration in the electrolyte in the lead-acid system, which varies according to the state of charge, serves as a yardstick from which the discharge capacity of the battery is determined.

It is a primary object of the invention to provide a multicell sealed lead-acid battery of the recombination type having the electrolyte fully absorbed within the plates and separators, in which the cells intercommunicate by gas redistribution so that imbalance in electrolyte fill levels among the cells are compensated for upon overcharge of the battery. It is a further object to provide a battery of the aforementioned type which can be discharged, charged (and overcharged), and stored in any indiscriminate attitude without intercell electrolyte migration or other adverse effect. It is still a further object in another aspect to provide the battery of the recombination type with cell assemblies consisting of plates and separators held under a common stacking pressure throughout the battery to optimize electrolyte distribution and to promote uniform utilization of the materials of the battery upon discharge, charge and storage. Other objects will become evident upon a reading of the following specification and claims.

In addition to the aforementioned prior art, the following references are also exemplary of the prior art: U.S. Pat. No. 2,742,520 (Pucher et al.); and U.S. Pat. No. 3,530,001 (Harivel).

SUMMARY OF THE INVENTION

Briefly described, in one aspect the invention is directed to a sealed lead-acid gas recombining battery capable of discharge and charge in any attitude without electrolyte loss, including: a plurality of electrochemical cells housed in a sealed monobloc container, the cells individually comprising porous positive and porous negative plates sandwiching a porous compressible separator under firm mutual stacking pressure, and an acid electrolyte in liquid form and of limited amount tightly absorbed within the plates and separator; the separator having a relatively greater electrolyte absorptive power than the adjoining plates with the bulk of the electrolyte of each cell being retained within the interstices of the separator, and a substantial portion of the pore volume of the plates remaining voided thereby facilitating gas transport during the gas recombination reaction upon charging; and partition members segregating the cells from direct physical and electrochemical contact yet constructed to define a gas space common to all the cells of the battery.

In another aspect, the invention covers a battery of the general type described above, in which the partition members are free from attachment with the monobloc container wall so that the stacking pressure between the plates and separator(s) of each cell is substantially uniform.

In another aspect, the cells of the aforementioned battery are electrically interconnected by intercell connectors fully housed within the sealed container and which bridge across the partition members within the common gas space.

In still another aspect, the invention pertains to a sealed multicell lead-acid battery, including: a sealed monobloc container provided with a resealable safety valve adapted to vent at a pressure of at least about one psig; a plurality of electrochemical cells housed in the container, each cell including a porous lead dioxide positive plate, a porous lead negative plate, an absorbent separator sandwiched between the plates under firm stacking pressure, and a liquid acid electrolyte in limited amount tightly absorbed within the plates and separators; the separator formed of a compressible mat comprising ultrafine glass fibers the major portion of which (by weight) have fiber diameters of less than about 3 micron, and the mat having an uncompressed porosity of from about 70 to about 98 percent, the separator having a relatively greater electrolyte absorptive power than the adjoining plates; the electrolyte having a minimum specific gravity of about 1.3 and being present in such an amount that at least about 60 percent of the electrolyte of each cell is retained by the separator, and a substantial portion of the pore volume of the plates remains voided; and partitioning members segregating the cells from direct physical contact yet constructed to define a gas space common to all the cells of the battery.

BRIEF DESCRIPTION OF THE DRAWINGS

The invention will be more particularly described in certain of its preferred embodiments in conjunction with the accompanying drawings, in which like numerals designate like parts, and in which.

PREFERRED EMBODIMENTS OF THE INVENTION

Figure 1:
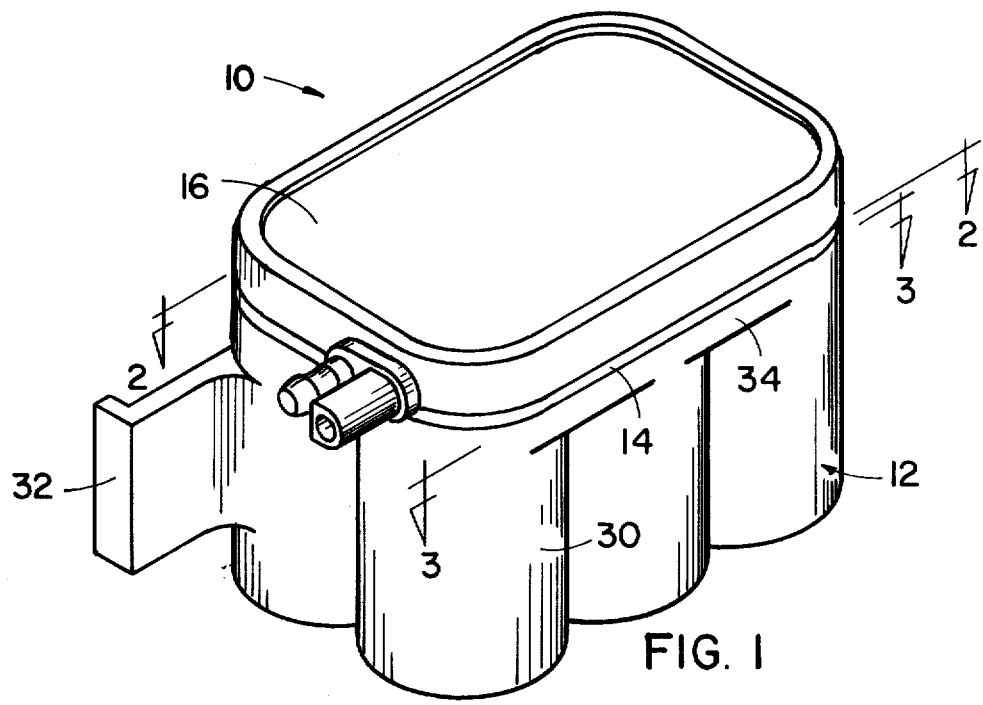
FIG. 1 is a perspective view of one battery configuration of the invention, employing spirally wound cells.
Figure 2:
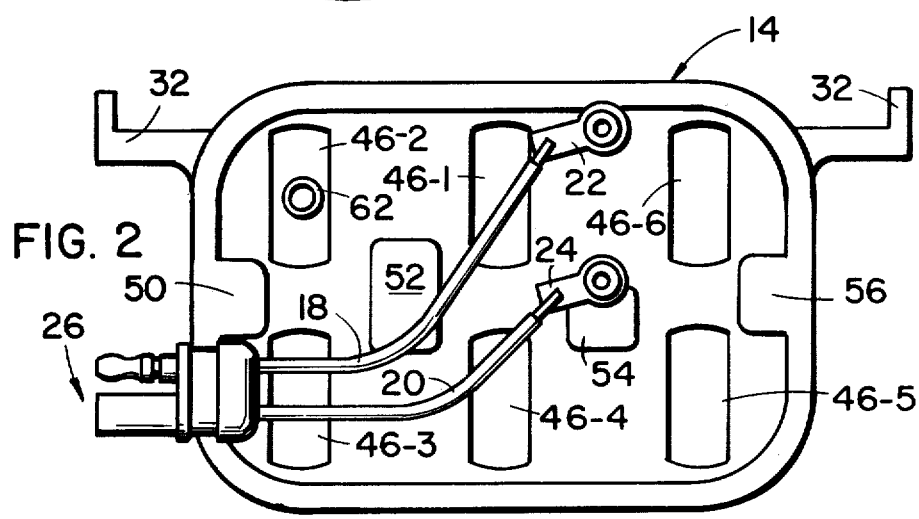
FIG. 2 is a plan view of the inner top of the battery taken along 2—2 of FIG. 1.
Figure 3:
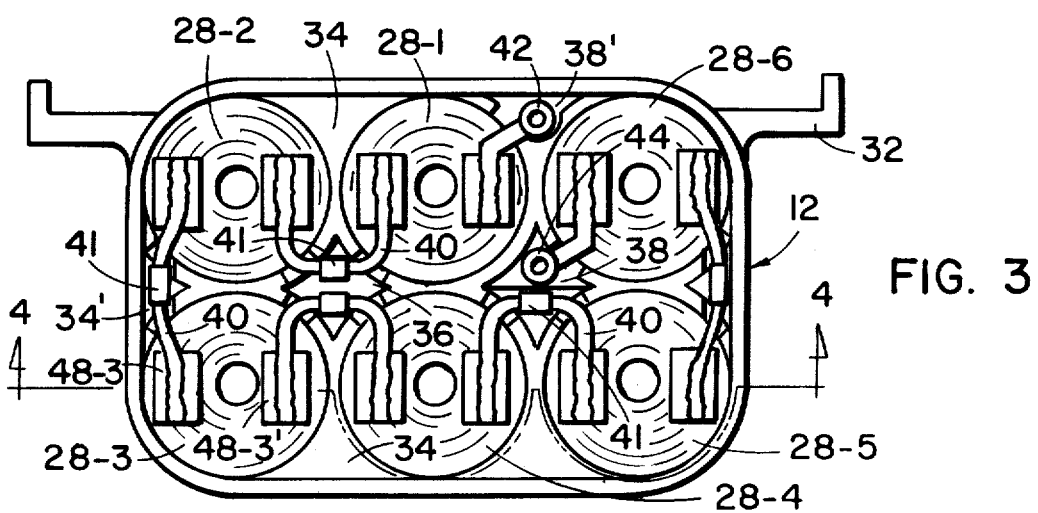
FIG. 3 is a plan view of the top of the cell elements (without inner top 14) of the battery of FIG. 1 taken along 3—3.
Figure 4:
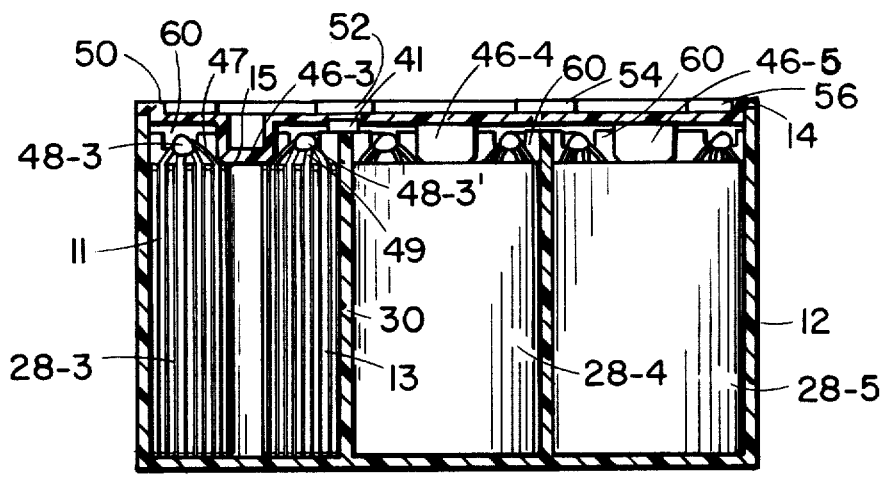
FIG. 4 is a side elevational, partial sectional view taken along 4—4 of FIG. 3, including inner top 14 but omitting outer top 16 and mounting ears 32 for clarity.

Referring first to the embodiment of FIGS. 1–4, there is shown generally at 10, as an example, a two by three 12 volt cylindrically wound lead-acid battery housed in a monobloc container 12, the mouth of which is sealed by inner lid 14, to produce a gas and electrolyte-tight battery. Leads 18, 20 attached respectively to the opposite polarity terminals 22, 24 of the battery are brought through outer top cover 16, which is attached to the inner top 14. The leads may terminate in standard terminal connector 26.

Monobloc container 12 is formed of an integral molding, machining or the like containing six cylindrical bores each housing a spirally wound cell element 28-1,-2,-3,-4,-5, and -6. The cylindrical walls 30 of each of the six cells of the monobloc, which merge together at tangential contact points between the respective cells, are preferably formed of any suitable insulating material of sufficient strength to withstand internal gas pressure, such as ABS, polypropylene, polystyrene and polycarbonate, and other materials stable in the electrolyte. Glass fibers or other reinforcing materials may be incorporated. If conductive materials are used they are suitably lined with hydrophobic nonconductive insulators. The monobloc casing may also be provided with adapter ears 32 for mounting onto the device being powered by the battery. The monobloc is also provided with generally planar strengthening webs 34 along the sides and 34' along the ends. Further webs or recesses 36, 38 and 38' also serve to house the intercell connectors 40 and terminal posts 42, 44 and lend physical support to the connectors.

The inner top 14 is designed in conjunction with the monobloc lower container 12 to give the finished battery considerable resistance to vibrational forces. This is enabled largely by the relatively tight fit of the cylindrically wound elements in their respective bores of the monobloc, and by the restraint provided in the axial direction by the recessed protuberances 46-1,-2,-3,-4,-5 and -6. As shown best in FIG. 4, each of the protuberances such as 46-3 bear down substantially on the upper portion of the wound cell pack, particularly on the extended compressible separator layers 15. The extended separator serves as a cushion for the protruding elements to react against when vibration is experienced. These recessed protruding elements nest between each pair of welded tab connections, e.g., 48-3, 48-3', of opposite polarity.

Figure 6:
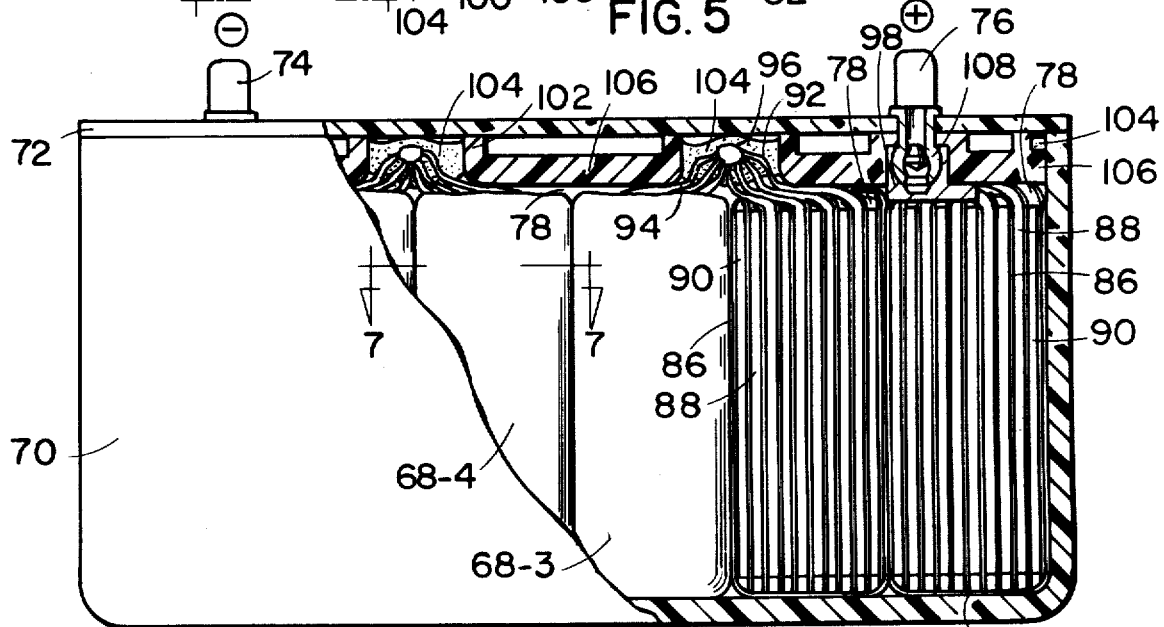
FIG. 6 is a cutaway, partial elevational sectional view of the battery of FIG. 5 taken along 6—6.

Inner top 14 also carries raised protuberances 50, 52, 54, 56 to provide clearance for the intercell connectors. These intercell connectors 40, interconnecting the cells in series, each carry an insulating sleeve 41 for example of plastic or tar, or the connectors may be potted in an epoxy or the like, to preclude intercell creepage of electrolyte. Bosses are provided in the inner lid 14 to house through-the-wall connectors to link terminal posts 42, 44 respectively with output terminals 22, 24. A preferred sealed connection is shown in FIG. 6, more particularly described in McClelland et al. U.S. Pat. No. 3,704,173.

In this embodiment, the monobloc container 12 provides six cylindrical bores defining the walls of the cells as well as the intercell partitions 30, which are rigid and closed at the bottom, while open at the top. With each of the cells open at the top, a common gas space or manifold 60 is formed thereabove which interconnects all of the cells. This common gas space is sealed from the exterior of the battery, however a resealable safety valve 62, e.g., of the Bunsen type, is provided in communication with the gas space to release gas when experiencing abnormally high internal pressures above the predetermined super atmospheric valve releasing pressure.

The individual cell elements 28-1–28-6 are typically constructed in accordance with the invention detailed in U.S. Pat. No. 3,862,861, which is hereby incorporated by reference. Thus, the materials and arrangement of cell components are chosen to provide a battery capable of discharge and charge (including overcharge) in any attitude without electrolyte loss or significant intracell migration, and with the ability to recombine oxygen at high rates of efficiency (e.g., above about 99 percent at the C/10 overcharge rate) while simultaneously achieving relatively high energy densities per unit of weight.

As an example, the cells may be constructed by spirally winding together under tension thin flexible plates and interleaved compressible separators into a self-supporting roll dimensioned to form a more or less snug fit within each of the bores of the monobloc. The positive and negative plates may be formed respectively of electrochemically active lead and compounds of lead which, upon electroforming, produce positive plates containing lead dioxide as the electrochemically active material, and negative plates having lead in sponge form as the active material. The plates are formed by pasting grids with such active materials. The grids may be made of cast or wrought lead, for instance formed into a perforated sheet or expanded mesh. The lead used for the grid has a high hydrogen overvoltage and is preferably pure lead of at least 99.9 percent by weight purity, with the impurities not serving to substantially reduce the hydrogen overvoltage, or an alloy of lead naturally having a high hydrogen overvoltage, such as lead/calcium, lead/calcium/tin, or the like. The grid may also be formed of composites of plastic materials with lead or other conductive matter for weight reduction. Preferably the grids are provided with collector tab extensions 47 and 49, of opposite polarity (four shown per cell), which are joined such as by welding with intercell connectors 40 to form respective unitary connections e.g., 48-3, 48-3'.

The active paste material may be applied to the grid in any known manner, such as by the process taught in Ching et al. U.S. Pat. No. 4,050,482. The resultant opposite polarity pasted plates 11, 13 and interleaved separator 15 are then spirally wound into a cylindrical element, for instance in accordance with the teaching of Hug et al. U.S. Pat. No. 4,099,401, with collector tabs 47 and 49 lining up on opposite sides of the open end of the wound element.

Choice of the separator material is critical to proper operation of the battery in a sealed, recombining mode. The separator has an extremely high absorptivity toward the electrolyte so that it may exert a wicking effect on the plates, serve to retain the bulk of the electrolyte required to sustain the electrochemical reactions, and provide the battery with a high capacity per unit of weight. Therefore, the separator must also have a high porosity, preferably from about 70 to about 98 and more preferably from about 85 to about 95 percent. In comparison with the plates which have lesser porosities, e.g., typically from about 40 to about 60 percent, the separator also has a greater electrolyte absorptive power. Thus, when a prescribed limited or "starved" amount (substantially less than the amount capable of being absorbed by the plates and separators) of electrolyte is introduced into the battery and becomes tightly absorbed within the plates and separator, the relative greater electrolyte absorptive power of the separator produces an automatic wicking action whereby the bulk of the electrolyte becomes absorbed in the separator phase. Because of the higher electrolyte absorptive power of the separator and the presence of only a starved electrolyte amount, a substantial portion of the pore volume of the plates remains unfilled with electolyte (voided), more or less uniformly throughout the pore volume of the plates including the geometric outer surface. In this manner, a large portion of the lead particles of the plates, and the pores defined between the particles, are covered by only a thin layer or film of electrolyte thereby producing the well known three-phase boundary condition conducive to gas transport (diffusion in the gas phase) on overcharge.

While the electrolyte is disproportionately distributed in each cell so that preferably at least about 60 percent, more preferably at least about 65 percent, and most preferably at least about 70 percent of the electrolyte is contained within the interstices or pores of the separator, with the remaining amount of electrolyte being absorbed within the pore structure of the plates, there still remains some unfilled pore volume within the separator. A low tortuosity direct path is thus available for oxygen evolved at the positive on overcharge to pass directly through the separator and into the negative plate where it is consumed at the thin electrolyte layer surfaces throughout its pore volume.

Some of the oxygen will traverse up over the top edge of the cell pack, into the common gas space 60, and then be consumed at the negative electrode of one of the other cells of the battery. A cell which has a relatively greater electrolyte fill will preferentially develop (unrecombined) oxygen before the remaining cells of the battery (having lower electrolyte fill levels). The unrecombined oxygen thus evolved from the over-filled cell with diffuse through the common gas space and recombine preferentially with a cell which has the least amount of electrolyte. This overall reaction on overcharge will tend to balance or equalize the electrolyte amounts of all the cells, and thereby tend to balance the overcharge acceptance of all the cells which tends to lengthen the service life of the battery. The uniformity in electrolyte distribution between the cells results in a more coordinated state of overcharge, which improves with further overcharging and cycling.

Since the porous lead dioxide positive plates (after electroforming) and lead sponge negative plates themselves have a high heat of wetting and absorptive power toward sulfuric acid, the separator material should be chosen to also have a very high heat of wetting and, coupled with this, a large surface area which together define an absorptive power even greater than that of the plates. A high surface area siliceous material is preferred. A separator material which in practice has offered these features is formed of a mat of ultrafine (microdiameter) glass fibers intermingled to form a compressible sheet or mat. The mat must be compressible so that upon winding or stacking of the elements of the cell, it conforms intimately to the contour of the surface of the plates so that it may perform its wicking or capillary action. In general, the plates and separators are held together under firm mutual stacking pressure.

To achieve the high surface area required, the major portion by weight of the high heat of wetting fibers (e.g., glass) have diameters of less than about 3 micron, more preferably less than about 0.9 micron. Various grades of coarser and finer materials may be incorporated with the above-mentioned ultrafine fibers to provide added tensile strength or other physical properties to improve handling of the mat during assembly. For instance, a typical mat may have from about 75 to about 85 percent by weight of 0.6 micron fiber, from about 5 to about 15 percent by weight of 3 micron fiber, and rovings to provide added strength to the mat in an amount from about 3 to about 10 percent by weight having diameters from about 7 to about 20 microns. Utilizing fiber diameters in these preferred ranges, the mats of the invention preferably have surface areas in the range from about 0.05 to about 20, and more preferably from about 0.1 to about 20 square meters per gram of fiber material (silica in the case of glass).

The separator can also be in the form of relatively large diameter rovings, to provide the required tensile strength for the separator, loaded with ultrafine siliceous particles such as diatomite or perlite to provide the necessary high surface area.

The electrolyte amount and type are also important in this battery. Liquid sulfuric acid is employed having a specific gravity of preferably at least about 1.30, more preferably at least about 1.33, while striving to keep the specific gravity below about 1.40 to suppress corrosion. With the higher density electrolyte, less electrolyte volume may be bound in the cell subassemblies while simultaneously achieving the goals of high capacity and thin layer condition in the plates required to sustain gas recombination at high overcharge rates.

A liquid sulfuric acid is employed, rather than gelled electrolyte which presents a number of drawbacks known to those skilled in the art. In general, from about 8 to about 10 and more preferably from about 8.5 to about 9.5 cc of 1.33 specific gravity sulfuric acid are introduced per ampere hour capacity of each cell.

The battery of this type also has the ability to self-adjust for component imbalances within the cell to some degree. Thus, one or more cells may be overfilled to an extent such that too thick a layer of electrolyte (even to the extent that a substantial proportion of the pores are completely filled) exists on the pore surfaces within the electrode plates. Upon overcharge, a portion of the oxygen generated will be expelled from the cell and either recombined with another cell, which has a lower fill level, via the common gas space or be vented from the system through resealable valve 62. This valve may be set at a desired superatmospheric pressure level of at least one psig, preferably greater than about 10 and more preferably greater than about 30 psig, the upper limit being dictated in part by the case physical properties. As the electrolyte in the form of oxygen and/or hydrogen is vented from the system, the density of electrolyte increases and eventually the electrolyte layer on the plate pore surfaces will diminish to a reduced thickness and an equilibrium will be reached. Because of the higher absorptivity toward electrolyte of the separator material, which is in intimate capillary contact through compression with the plates, a distribution will be attained whereby the bulk of the electrolyte remains in the separator, and the plates contain the voided or thin layer condition conducive to oxygen recombination. Therefore, if excess electrolyte is introduced initially at a sufficiently low density, e.g., 1.26–1.28, upon overcharge excess gases evolved will be released through the resealable safety valve rather than being recombined until the rate of recombination keeps up with, or is in equilibrium with, the overcharge rate and the disproportionate electrolyte distribution of the invention is achieved. In this manner, the specific gravity of the electrolyte may be elevated to above the preferred minimum level of 1.30.

These general requirements with respect to the separator and plate materials employed, and electrolyte distribution within those plates and separators, apply to the other illustrated embodiments of the invention. Turning next to the embodiment shown in FIGS. 5–7, a 12-volt "flat wound" sealed lead-acid battery 66 is illustrated having six series connected cells including cells 68-1, 68-2, 68-3 and 68-4. The cells are housed snugly within a monobloc parallelepipedic container 70 sealed in liquid and gas-tight relation at its open mouth to an inner closure member 100, to which is attached outer closure member 72. Output terminals 74, 76 protrude in sealed fashion through the closure members. The battery is also provided with a single resealable safety valve member 80 which serves the same purpose as the previously described resealable safety valve member 62 of the embodiment of FIGS. 1–4. Valve 80 is set at a prescribed superatmospheric pressure, and is connected to the gas space 78 common to all of the cells.

Figure 5:
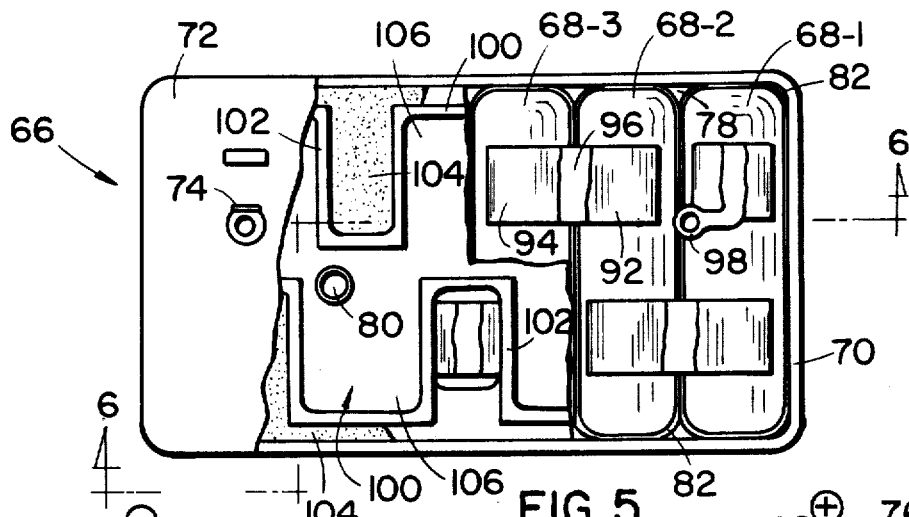
FIG. 5 is a partial cutaway, plan view of another battery configuration.
Figure 7:
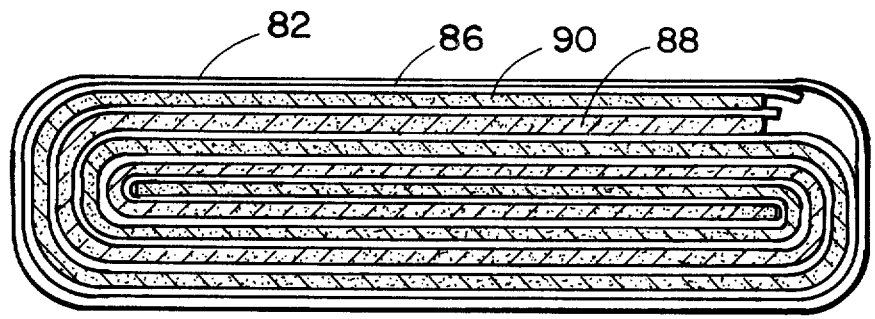
FIG. 7 is a sectional view along 7—7 of FIG. 6, of a single cell subassembly.

Whereas in the embodiments of FIGS. 1–4 rigid intercell partition members were employed, a special feature of the embodiment of FIGS. 5–7 is the use of partition members 82 which are free from attachment with the monobloc container 70. In this embodiment the partition members 82 take the form of flexible polymeric bags closed at their bottom portion 84 and open at their top portion to the gas space 78. Because the bags 82 are free from attachment with the monobloc case, the assembly of six flat wound cells may be compressed together as a unit to the desired uniform level of compression and introduced into the battery whereby the desired compression level is maintained. The key advantage with this embodiment is that the "floating" partition members permit all six of the cells to be mutually compressed together at a common stack pressure. In this manner, the separators 86 of all of the cells tend to reach equal levels of compression and thereby exert a uniform level of absorption toward the electrolyte throughout the battery. This in turn stabilizes the electrolyte thickness on the pore walls of the porous plates throughout the battery.

Uniform compression of the elements also prevents failure of the battery due to shedding of the active material, in contrast to flooded starting, lighting and ignition batteries. A more compact battery is thus provided—allowance for "mud" space is obviated. Moreover, unlike standard maintenance-free batteries, there is no need to enclose either the positive or negative plates in an enveloped separator to prevent shorting resulting from shedding.

In this example, separator 86 is sandwiched between the positive plate 88 and negative plate 90, and assembled in a flattened wound configuration so as to fill a substantially parallelepipedic flexible bag member 82.

In this embodiment as seen best in FIGS. 5 and 6, the intercell connections are made by first positioning the cell packs so that opposite polarity tabs are in adjacent alignment, and then folding together the tabs of opposite polarity from adjacent cells, e.g., negative tabs 92 from cell 68-2 with positive tabs 94 emanating from cell 68-3, and welding them or burning them together to form a unitary connection 96. After this has been completed to interconnect all six cells, and terminal posts such as positive post 98 have been welded into position, a nonconductive, e.g., plastic, inner top 100 having a series of U-shaped openings 102 is positioned over the top of the opened battery. Potting compound 104 is then introduced over, around and under each of the welded intercell connections and terminals bounded by the U-shaped dams 102, and in the perimeter passageways interconnecting each of the U-shaped dams. Inner top 100 serves to define the upper boundary of common gas space 78.

The inner top is also provided with an inward portion 106 which is substantially planar and recessed to provide protuberances which are spaced closely to the top portion of the individual cell packs and intermediate the welds as shown in FIG. 6, to improve vibration resistance (similar to recessed protuberances 46-1 . . . -6 of FIGS. 1–4). The entire top 100 along its margin is sealed in gas and liquidtight fashion to the sidewalls of container 70. This may be done by heat sealing, ultrasonic welding, bonding or the like.

The sealed terminal connections through the lids from post 98 to terminals 76 may advantageously employ an expansion member 108, e.g., an externally expanded rivet, as more fully discussed and shown in aforementioned U.S. Pat. No. 3,704,173.

Figure 8:
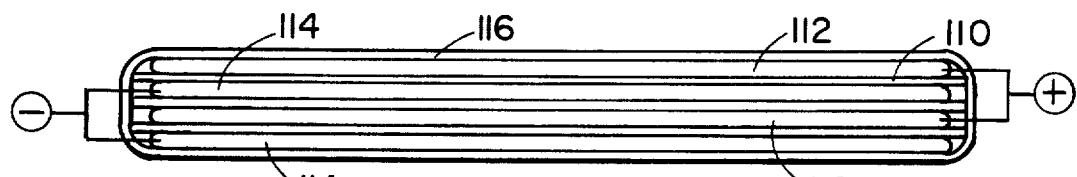
FIG. 8 is a top plan view similar to FIG. 7 of an alternative cell configuration according to the invention.

As a further alternative embodiment, reference is made to FIG. 8 of the drawings. A single cell subassembly of a multicell battery (for instance of the general parallelepipedic type shown in FIGS. 5 and 6) is shown employing flat parallel plates. Separator material 110, preferably formed of ultrafine glass fiber mats as previously discussed, is sandwiched between a plurality of flat positive plates 112 and negative plates 114. The respective positive and negative plates are connected together in the usual manner, as shown schematically (for instance, the strap connections of FIG. 9 could be employed). The separator material preferably extends beyond the edges of the plates, in all directions, primarily to prevent shorting and serving to reabsorb any droplets of electrolyte (e.g., expelled by misoperation of the battery) that might come into contact with the extended separator portions.

The entire cell is held together by an insulator jacket 116, which may serve also as the intercell partition member. The jacket 116 is open at both the top and bottom ends of the cell, as shown, and may be formed conveniently of a shrink wrap plastic sleeve which has been heat shrunk to fit tightly against the cell components, or a wide tape of non-conductive material wrapped about the cell components and adhered back onto itself. The cells are compressed together into a multicell battery, of uniform cell-to-cell compression, similarly to the embodiment of FIG. 6. Because the electrolyte is fully absorbed within the separators and plates of an individual cell, in accordance with the general teaching of previously described U.S. Pat. No. 3,862,861, the electrolyte will not tend to migrate to an adjacent cell (as also in the case of the other embodiments). However, care should be taken that the extended separator members of one cell do not make contact or form a fluid path with separators of an adjacent cell.

Figure 9:
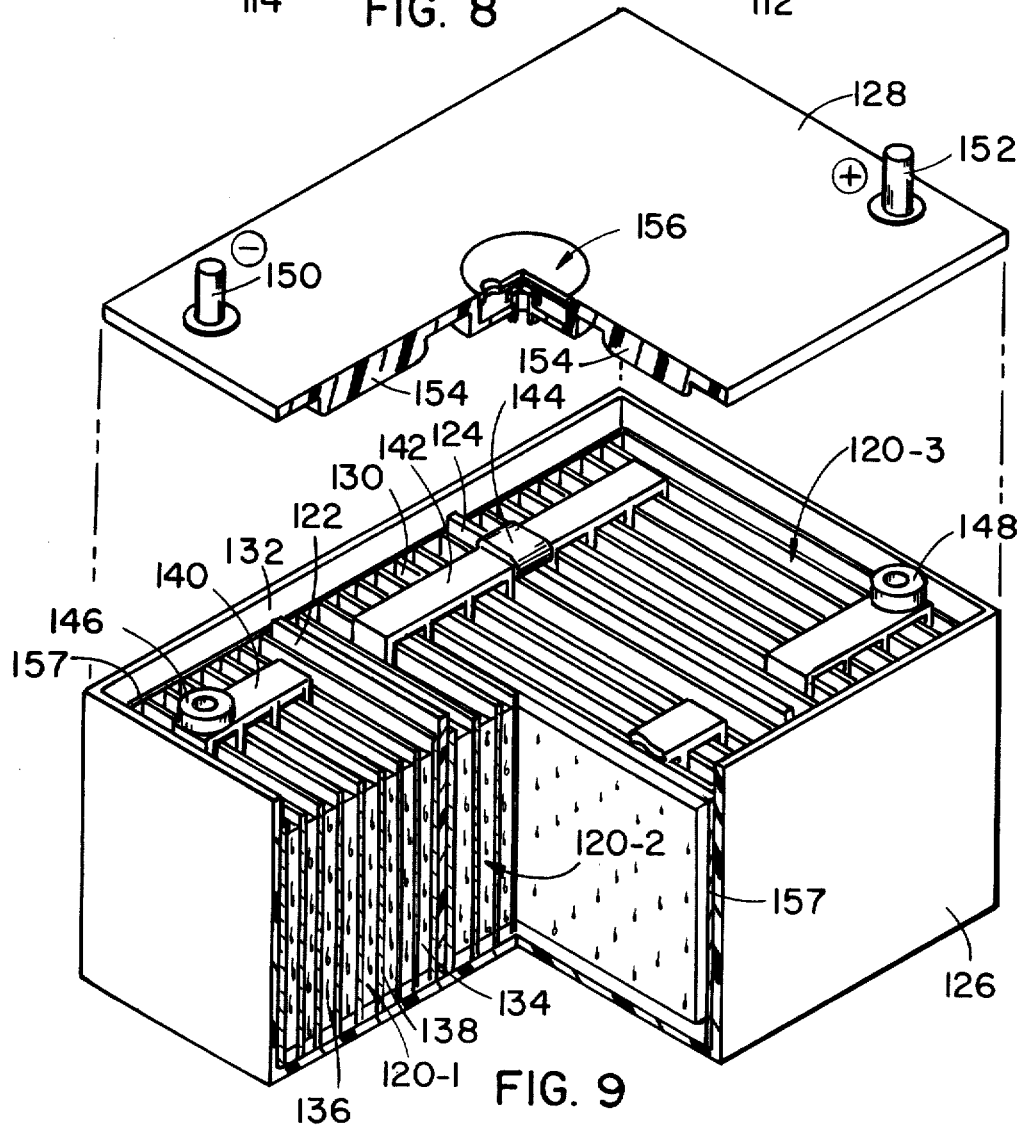
FIG. 9 depicts in partial sectional cutaway, and exploded, an alternative battery configuration in accordance with the invention.

In the embodiment of FIG. 9, there is shown another version of a flat parallel plate battery of the invention. The 6-volt battery comprises three series connected cells 120-1, 120-2, and 120-3. Similarly to the embodiment of FIG. 6, the cells are compressed together uniformly and spaced apart by partition members 122, 124, which are preferably free from attachment with the sidewalls or bottom of the monobloc container 126, or with the underside of lid 128. In this manner a uniform mutual compression between all of the elements of the battery is attained. However, if exactly uniform compression is not required for a particular application, partition members 122, 124 may be attached to or integral with the casing.

In either event, it is preferred that the partition members 122, 124 be configured, relative to case members 126 and 128 to provide a manifold or common gas space 130 defined between the top of the cell elements 120-1 . . . -3 and the underside of the container 128. This is conveniently accomplished by providing the monobloc case with a small lip extension 132 above the top of the intercell partition members 122, 124, thereby providing space for intercell communication.

The individual cells comprise a plurality of positive plates 134 and negative plates 136 spaced apart but in intimate face-to-face compressive contact with interleaved compressible separators 138. Connecting straps 140, 142, etc., tie together common polarity plates via extended tabs in each cell in conventional fashion. Intercell connections, e.g., at 144 are conveniently made in the common gas space 130 by bridging across the partition members 122, 124. As in the previous examples, these intercell connections may be protected from electrolyte creepage by sleeving within an appropriate plastic, tar, epoxy, or the like. Terminal posts 146, 148 are electrically connected through the lid member 128 to the respective negative and positive output terminals 150, 152, using the through-the-lid connectors of FIG. 6 or any other suitable terminal connection.

The lid member 128 is sealed to the monobloc container 126 to prevent gas and electrolyte leakage. Preferably a resealable safety valve 156 is also provided, in communication with the common gas space 130, for release of gas generated internally which exceeds the predetermined minimum venting pressure. For instance, abnormal operation or overcharging at an excessive rate will cause the valve to release gas and reseal automatically as the pressure is reduced to the venting pressure.

It is also preferred that the container top 128 be provided with downwardly protruding spacers 154, which are positioned in close proximity to each of the cell packs 120-1 . . . -3, and in between the connecting strap members 140, 142, etc., to provide vibration resistance to the battery. Vibration resistance is also enhanced by the firm stacking pressure existing between the separator and plate members of each cell whereby the compressibility and resilience of the separator withstands shock loading which the battery may be subjected to.

If desired to aid assembly of the cell components and stuffing into the monobloc container 126, a polymeric wrap 157 may be provided about the perimeter of the cells, as shown.

While certain representative embodiments and details have been shown for the purpose of illustrating the invention, it will be apparent to those skilled in this art that various changes and modifications may be made therein without departing from the spirit or scope of the invention.

What is claimed is:

1. In combination, a sealed lead-acid gas recombining battery capable of discharge and charge in any attitude without electrolyte loss, comprising:
    a plurality of electrochemical cells housed in a sealed monobloc container, the cells individually comprising porous positive and porous negative plates sandwiching a porous compressible separator under firm mutual stacking pressure, and an acid electrolyte in liquid form and of limited amount tightly absorbed within the plates and separator;
    said separator having a relatively greater electrolyte absorptive power than the adjoining plates with the bulk of the electrolyte of each cell being retained in the pores of the separator, and a substantial portion of the pore volume of the plates remaining voided thereby facilitating gas transport during the gas recombination reaction upon charging; and
    partition members segregating the cells from direct physical contact yet constructed to define a gas space common to all the cells of the battery.

2. The battery of claim 1 wherein the partition members are free from attachment with the monobloc container so that the stacking pressure between the plates and separator of each cell is maintained substantially uniform.

3. The battery of claim 2 wherein the partition members are formed of flexible polymeric bags each of which contains the components of one cell, the bags being open at one or both ends.

4. The battery of claim 1 wherein the cells are electrically interconnected by intercell connectors fully housed within the sealed container and bridging across the partition members within the common gas space.

5. A sealed multicell lead-acid gas recombining battery capable of discharge and charge in any attitude without electrolyte loss or intercell migration, comprising:
    a sealed monobloc container provided with a safety valve adapted to vent at superatmospheric pressure;

a plurality of electrochemical cells housed in the container, each cell including a porous lead dioxide positive plate, a porous lead negative plate, an absorbent separator sandwiched between the plates under firm stacking pressure, and a liquid acid electrolyte in limited amount tightly absorbed within the plates and separator;

said separator having a relatively greater electrolyte absorptive power than the adjoining plates so that the bulk of the electrolyte of each cell is retained by the separator, and a substantial portion of the pore volume of the plates remains voided thereby facilitating gas transport during the gas recombination reaction during charging; and partition members segregating the cells from direct physical contact yet constructed to define a gas space common to all the cells of the battery, whereby during charge (including overcharge) of the battery cell(s) having relatively greater electrolyte amounts will release gas which will migrate and be recombined at the negative plates of cell(s) having relatively lesser electrolyte amounts, thereby tending to balance the electrolyte amounts of all of such cells.

6. The battery of claim 5 wherein the partition members are free from attachment with the monobloc container so that the stacking pressure between the plates and separators of each cell is maintained substantially uniform.

7. The battery of claim 6 wherein the partition members are formed of flexible polymeric bags each of which contains the components of one cell, the bags being open at one or both ends.

8. The battery of claim 5 wherein the cells are electrically interconnected by intercell connectors fully housed within the sealed container and bridging across the partition members within the common gas space.

9. A sealed multicell lead-acid battery, comprising:

a sealed monobloc container provided with a resealable safety valve adapted to vent at a pressure of at least about one psig;

a plurality of electrochemical cells housed in the container, each cell including a porous lead dioxide positive plate, a porous lead negative plate, an absorbent separator sandwiched between the plates under firm stacking pressure, and a liquid acid electrolyte in limited amount tightly absorbed within the plates and separator;

said separator formed of a compressible mat comprising ultrafine glass fibers the major portion of which (by weight) have fiber diameters of less than about 3 micron, and the mat having an uncompressed porosity of from about 70 to about 98 percent, the separator thereby having a relatively greater electrolyte absorption power than the adjoining plates;

said electrolyte having a minimum density of about 1.3 and being present in such an amount that at least about 60 percent of the electrolyte of each cell is retained by the separator, and a substantial portion of the pore volume of the plates remains voided; and partition members segregating the cells from direct physical contact yet constructed to define a gas space common to all the cells of the battery.

10. The battery of claim 9 wherein the plates are substantially flat and stacked in parallel fashion to form a prismatic block, and said partition members are spaced from one surface of the container to define said gas space.

11. The battery of claim 9 wherein said plates and separators are wound spirally and contained within cylindrical bores formed in the monobloc container and positioned adjacently.

12. The battery of claim 9 wherein said plates and separators are flat wound and each cell housed in a flexible polymeric bag of general parallelepipedic shape, the cells being held together by mutual compression to produce a substantially uniform stacking pressure of the plates and separators throughout the battery.

13. The battery of claim 9 wherein the container includes a lid having a plurality of recessed protuberances in substantial contact with a portion of said cells, for enhanced resistance to vibrational forces.

14. In combination, a sealed lead-acid gas recombining battery capable of discharge and charge in any attitude without electrolyte loss, comprising:

a plurality of electrochemical cells housed in a sealed monobloc container, the cells individually comprising porous positive and porous negative plates sandwiching a porous compressible separator under firm mutual stacking pressure, and an acid electrolyte in liquid form and of limited amount tightly absorbed within the plates and separator;

said separator having a relatively greater electrolyte absorptive power than the adjoining plates with the bulk of the electrolyte of each cell being retained in the pores of the separator, and a substantial portion of the pore volume of the plates remaining voided thereby facilitating gas transport during the gas recombination reaction upon charging; and partition members segregating the cells from direct physical contact and being free from attachment with the monobloc container so that the stacking pressure between the plates and separators in the battery is maintained substantially uniform.

15. The battery of claim 14 wherein the partition members are formed of flexible polymeric material.

16. A sealed lead-acid gas recombining electric storage battery having a container and two or more cells each including a cell pack comprising one or more positive electrodes and one or more negative electrodes interleaved with compressible fibrous absorbent separator material, characterized in that each cell pack is substantially enclosed by a non sealed bag of flexible polymeric material open to a common gas space formed in the battery, and at least the opposed surfaces of adjacent cell packs enclosed by the bags are in face-to-face contact substantially along the full entirety of such opposed surfaces, the cells containing substantially no free unabsorbed electrolyte, and the cell packs are spaced apart solely by the walls of the said bags which are not sealed to the battery container.

17. The battery of claim 16 in which the amount of electrolyte is not sufficient to saturate the pores in the electrodes and in the separator material.

18. The battery of claim 16 in which the separator material comprises microfine glass fibers the major weight proportion of which have an average diameter of less than about 3 microns.

19. The battery of claim 16 in which a single resealable safety valve is in communication with a gas space which is common to all of the cells of the battery and thus vents all the cells as a unit.

20. A sealed lead-acid gas recombining battery capable of charge or discharge in any attitude without electrolyte loss, including a container having a compartment containing two or more cells, each cell containing at least one positive plate and at least one negative plate, adjacent plates being separated by separators of compressible acid-absorbent fibrous material, adjacent cells being spaced apart by intercell partitions of electrolyte impermeable material whose edges are not sealed to the sidewalls or the bottom of the compartment, the cells containing substantially no free unabsorbed electrolyte.

21. A sealed lead-acid gas recombining battery capable of charge or discharge in any attitude without electrolyte loss, including a container having a compartment provided with a safety valve venting means adapted to vent at superatmospheric pressure, and containing two or more cells each comprising at least one positive electrode and at least one negative electrode separated from each other by separators of compressible acid-absorbent fibrous material, adjacent cells being spaced apart by an intercell partition whose edges are juxtaposed to the sidewalls and bottom of the compartment and are not sealed thereto and are free from attachment therewith, the electrolyte within each cell being substantially fully absorbed within the plates and separators of the cell, and the bulk of the electrolyte in the cells being contained within the separator.

22. The battery of claim 20 or 21 in which the intercell partitions are substantially planar and are free from attachment to the container so as to be "floating."

23. The battery of claim 20 or 21 in which the individual cells are enclosed by a bag of flexible polymeric material open to a common gas space formed in the battery.

24. The battery of claim 20 or 21 in which the amount of electrolyte present is insufficient to saturate the pores in the electrodes and in the separators.

25. The battery of claim 20 or 21 in which the separators are formed of a matting of microfine glass fibers.

26. A sealed lead-acid gas recombining battery having a compartment containing a plurality of cells separated respectively from one another by an intercell partition whose edges are not sealed to the compartment thereby defining a gas space common to the cells, each cell comprising at least one positive electrode and at least one negative electrode separated from each other by separators of absorbent fibrous material and containing substantially no free unabsorbed electrolyte, the positive plates of one cell being connected to the negative plates of an adjacent cell by an intercell connector which passes over the intercell partition and is contained within the common gas space, and in which the intercell connector is provided with an electrolyte creepage barrier.

27. The battery of claim 26 in which the electrolyte creepage barrier is formed of a sleeve of plastic, tar or epoxy resistant to acid electrolyte.

28. The battery of claim 26 in which the electrodes and separators of each cell are contained within a polymeric bag, the material of the polymeric bag serving as the intercell partition.

29. The battery of claim 26 in which the amount of electrolyte in each cell is insufficient to saturate the pores in the electrodes and in the separators.

30. The battery of claim 26 in which the separator material comprises microfine glass fibers.

31. A sealed multicell lead-acid gas recombining battery which may be discharged or charged in any attitude without electrolyte loss, comprising a container, a plurality of cell packs housed in the container, each cell pack having at least one porous positive plate and at least one porous negative plate separated by and pressed against an acid-absorbent compressible porous separator material, adjacent cell packs being spaced apart by intercell partitions whose edges are free from attachment with the container thereby defining cell-to-cell mutual compression and a gas space common to the cells, the acid electrolyte being in liquid form and being substantially fully absorbed in the porous plates and separators with at least about 60 percent of the electrolyte contained within a cell pack being retained by the separator.

32. The battery of claim 31 wherein opposed surfaces of adjacent cell packs are mutually pressed against the intercell partition substantially uniformly along the full entirety of such surfaces.

33. The battery of claim 31 wherein the separator is formed of a mat of glass fibers the major portion of which (by weight) have fiber diameters of less than about 3 microns.

34. In a sealed lead-acid recombining multicell battery of the limited electrolyte type in which pore surfaces of the plates are unsaturated and carry a thin film of electrolyte thereon, and in which the separator carries the bulk of the electrolyte yet is gas permeable to permit oxygen to permeate therethrough to recombine upon overcharge with the negative plate materials, an improved construction adapted to promote equalization of the electrolye film thickness on corresponding pore surfaces of the respective plates throughout the battery comprising:

a sealed monobloc container provided with a resealable safety valve adapted to vent at a pressure of at least about one psig;

a plurality of cells housed in the container, each cell containing a porous lead dioxide positive plate, a porous lead negative plate, an absorbent separator sandwiched between the plates under pressure, and a liquid acid electrolyte in limited amount absorbed within the plates and separator;

said separator formed of a compressible mat comprising ultrafine fibers the major portion of which (by weight) have fiber diameters of less than about 3 microns, and the mat having an uncompressed porosity of from about 70 to 98 percent, a portion of the pore volume of the separator remaining voided for transmission of gas in the gaseous phase;

said electrolyte having a minimum density of about 1.3 and being present in such an amount that at least about 60 percent of the electrolyte of each cell is retained by the separator, and a substantial portion of the pore volume of the plates remains voided; and partition members segregating the cells from direct physical contact yet constructed to define a gas space common to all the cells of the battery.

35. The battery of claim 34 wherein at least about 65 percent of the electrolyte is retained by the separator.

36. The battery of claim 34 wherein the separator is formed of ultrafine glass fibers, the separator having a greater electrolyte absorption power than the adjoining plates.

37. The battery of claim 1 wherein at least about 70 percent of the electrolyte of each cell is retained in the pores of the separator, the separator having a porosity of from about 70 to about 98 percent which is greater than the porosity of the plates, and the separator containing some residual pore volume unfilled with electrolyte for enhanced gas transport therethrough.

* * * * *